United States Patent [19]

Jones et al.

[11] Patent Number: 4,521,623
[45] Date of Patent: Jun. 4, 1985

[54] 2,2-BIS[(2-HALO-4-AMINOPHENOXY)-PHENYL]-HEXAFLUOROPROPANE

[75] Inventors: Robert J. Jones, Hermosa Beach; Glenn E. C. Chang, Redondo Beach, both of Calif.

[73] Assignee: TRW Inc., Redondo Beach, Calif.

[21] Appl. No.: 581,391

[22] Filed: Feb. 17, 1984

Related U.S. Application Data

[62] Division of Ser. No. 483,024, Apr. 7, 1983.

[51] Int. Cl.$^3$ ............................................. C07C 87/48
[52] U.S. Cl. ................................................... 564/430
[58] Field of Search ......................................... 564/430

[56] References Cited

U.S. PATENT DOCUMENTS

| | | | |
|---|---|---|---|
| 3,895,064 | 7/1975 | Brode et al. | 564/430 |
| 3,897,497 | 7/1975 | Brode et al. | 564/430 |
| 3,988,374 | 10/1976 | Brode et al. | 564/430 |
| 4,196,144 | 4/1980 | Darms | 528/185 |

Primary Examiner—Lester L. Lee
Attorney, Agent, or Firm—John T. Wiedemann; Donald R. Nyhagen

[57] ABSTRACT

There are provided the aromatic diamines 2,2-bis-[(2-halo-4-aminophenoxy)-phenyl]hexafluoropropane, where the attached ortho halogen is preferably chlorine, and 4,4′-bis(4-aminophenoxy)biphenyl, as novel monomers for polyimide polymerizations. The former, when reacted with 2,2-bis(3,4-dicarboxyphenyl)hexafluoropropane dianhydride, provides a polyimide having exceptional high-temperature performance. The latter diamine is a low-cost monomer for polyimide production.

2 Claims, No Drawings

2,2-BIS[(2-HALO-4-AMINOPHENOXY)PHENYL]-HEXAFLUOROPROPANE

BACKGROUND OF THE INVENTION

The invention described herein was made in the performance of work under NASA Contract No. NAS3-23274 and is subject to the provisions of Section 305 of the National Aeronautics and Space Act of 1958 (72 Stat. 435; 42 U.S.C. 2457).

This is a division of application Ser. No. 483,024, filed Apr. 7, 1983.

Studies have shown that the use of fiber-reinforced organic matrix resin composites in aircraft engines and nacelle structures can result in significantly improved engine performance. The weight reduction attendant to substituting plastics for metals in aircraft components and structures can result in up to a 50% fuel savings as well as significant improvement in mission performance. To date, no organic matrix resin is available for use that can provide at least 100-hour service in air at a temperature of about 700° F. in pressure environments up to 10 atmospheres of compressed air, as are now being required for new advanced aircraft engines.

Linear aromatic/heterocyclic condensation polyimides as a class of polymer have found widespread application in the aerospace industry due to their toughness and flexibility, high thermal and thermo-oxidative stability, solvent resistance, and excellent mechanical properties. They may be generally characterized as the reaction products of an equimolar amount of an aromatic tetra-acid or derivative, i.e., dianhydride or diester, and an aromatic diamine. The reaction is usually run at or near ambient temperature in a high-boiling polar aprotic solvent, e.g., dimethyl formamide, dimethyl acetamide, or N-methyl-pyrrolidinone, at a solids loading of up to 40% by weight. This gives rise to an intermediate polyamide-acid, which is then concentrated and transformed to final polyimide by heating at elevated temperatures up to about 600° F., depending on whether reduced pressure is employed.

A linear condensation polyimide based upon a reaction of four-ring aromatic diamine, 2,2-bis[(4-aminophenoxy)-phenyl]hexafluoropropane and pyromellitic dianhydride, as described in U.S. Pat. No. 4,111,906 to one of us, possessed promise as a matrix resin for use in jet compressor stage stator bushings at 675° F. use temperature. However, the critical temperature increase from 675° F. to 700° F. required for the new generation of advanced aircraft engines deleteriously affects the performance of this polyimide. The only other known resin which was thought to have equal or higher promise at these high temperatures was a resin once marketed by Du Pont as NR-150B. This was a linear condensation polyimide based upon single ring aromatic diamines and 4,4'-(hexafluoroisopropylidene)diphthalic anhydride as described in U.S. Pat. No. 3,356,648; this product, however, is no longer commercially available.

We have been in quest of novel polyimide polymer systems suitable for a minumum service life of 100 hours at 644° K. (700° F.) in air at pressures up to 10 atmospheres.

SUMMARY OF THE INVENTION

There have been synthesized two new aromatic four-ring diamines. They are 2,2-bis[(2-halo-4-aminophenoxy)phenyl]hexafluoropropane (2-X-4-BDAF) of the formula:

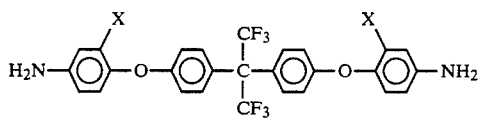

wherein X is a halogen, preferably chlorine, and 4,4'-(4-aminophenoxy)biphenyl (4-BPDA) of the formula:

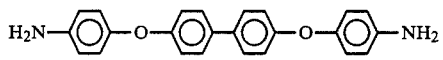

The former provides an exceptional monomer for high-temperature-performance polyimides, especially when polymerized with 2,2-bis(3,4-dicarboxyphenyl)-hexafluoropropane dianhydride (6-FDA), while the latter has value as a novel low-cost monomer for polyimide production.

Novel polyimides in accordance with this invention provide units of the structure:

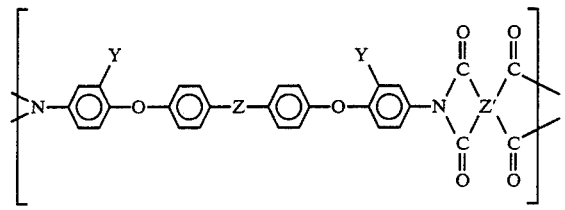

wherein Y is halogen or hydrogen, and Z is a covalent bond when Y is hydrogen and

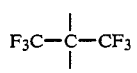

when Y is halogen, and Z' is

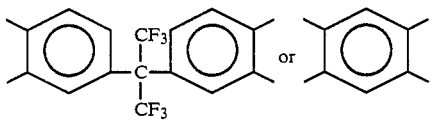

The presently preferred halogen is chlorine.

The preferred polyimides are copolymers having repeating units of the structure:

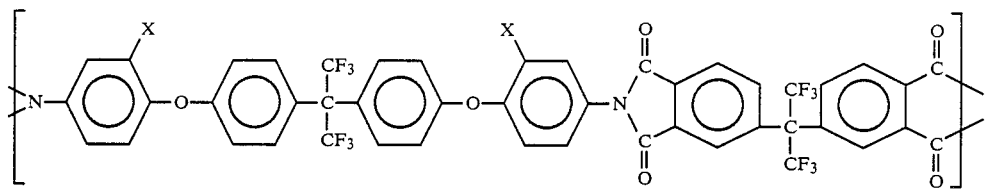

Again, the preferred halogen is chlorine.

DETAILED DESCRIPTION

The present invention is directed to the formation of novel aromatic diamines for condensation reaction with monomers having reactive anhydride groups to provide polyimides.

Novel aromatic diamines of greatest interest are 2,2-bis[(2-halo-4-aminophenoxy)-phenyl]hexafluoropropanes (2-X-4-BDAF) of the formula:

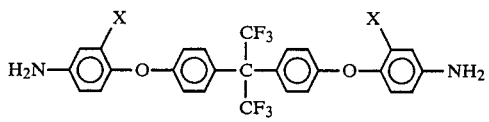

wherein X is halogen. The presently preferred halogen is chlorine. The diamines have halogen ortho to the ether linkage and appear to protect the ether linkage against thermal degradation. Unexpectedly, surprisingly exceptional high-temperature performance has been established for the reaction product of such diamine with 2,2-bis(3,4-dicarboxyphenyl)hexafluoropropane dianhydride (6-FDA) to form polymers having repeating units of the formula:

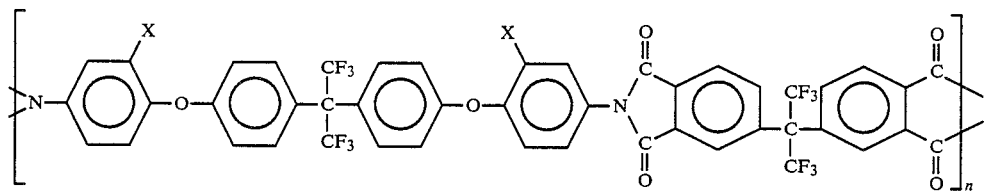

wherein X is halogen and n is the number of repeating units in series. Such polymers have superior thermal and thermooxidative stability at temperatures of about 700° F. (644° K.). Other reactive monomers may be substituted in whole or in part for the specific dianhydride, and other diamines can be used to dilute the primary diamine, but such changes have an effect on polymer properties, and, in particular, appear to detrimentally affect the polymer's oxidative resistance. For instance, substituting pyromellitic dianhydride (PMDA) of the structure:

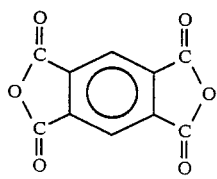

for 6-FDA will increase weight loss at elevated temperatures.

The second novel aromatic diamine synthesized by us in our quest for a novel polyimide polymer system suitable for use at air temperatures of about 700° C. for a minimum service life of about 100 hours is 4,4'-bis(4-aminophenoxy)biphenyl (4-BPDA), which has the formula:

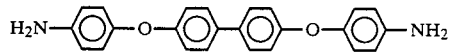

While polyimides produced from this diamine did not prove to have satisfactory resistance to thermal degradation at temperatures of about 700° F. when compared with applicants' novel 2-X-4-BDAF/6-FDA polymer, it is a utile low-cost monomer for polyimide polymerizations.

The novel monomers of this invention are prepared according to the procedure described in U.S. Pat. No. 4,203,922 to Jones, O'Rell and Hom, incorporated herein by reference, with specific procedures detailed in the Examples attendant hereto.

The polyimides prepared in accordance with this invention are prepared in solution from their precursors, followed by solvent evaporation in vacuo, then thermally imidized in air at 473° K. (392° F.). Dimethylacetamide (DMAc) was employed as the preferred polymerization solvent and the monomers were combined at about a twenty-five-percent (25%) solids loading in the solvent. Solvent and varnish solids loading were selected because prior work employing this combination yielded the promising initial thermo-mechanical results.

A representative reaction sequence to prepare the linear condensation polyimide candidates is in accordance with the following reaction sequence for PMDA and 2-Cl-4-BDAF:

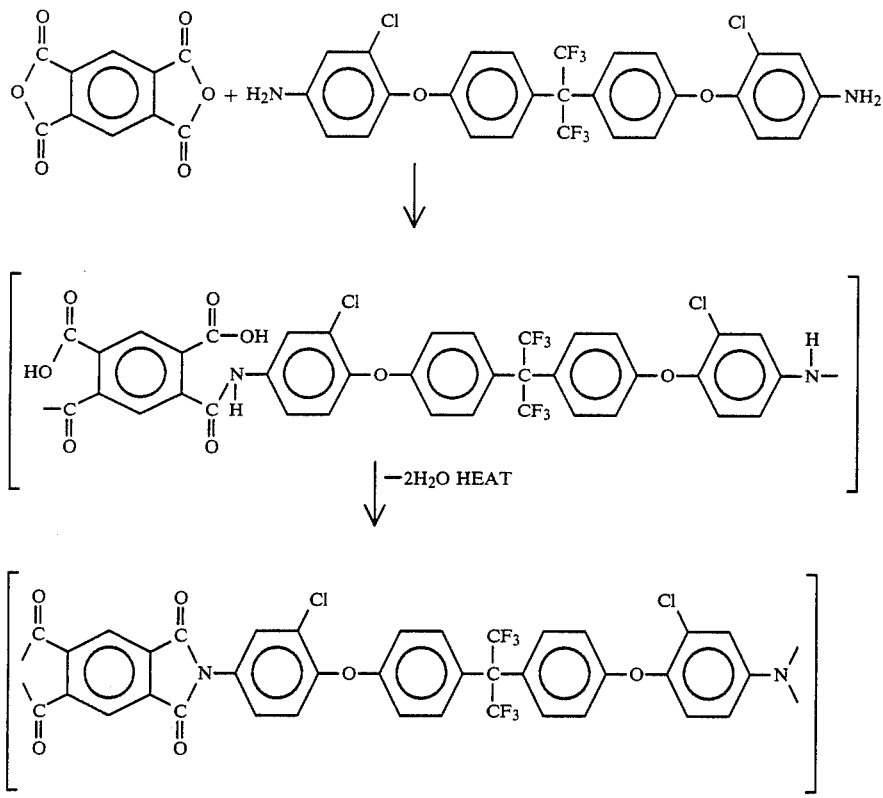

Post-curing at from about 400° to 750° F., preferably from about 650° to 750° F., for up to 24 hours may be used to remove volatiles as a predicate to molding of the final product.

Without limit, the following Examples and Controls illustrate the preparation of novel monomers and polymers, and compare their thermal properties.

For purposes of the following Examples, 3,4-dichloronitrobenzene was obtained from Aldrich Chemical Company. Obtained from Buffalo Color Corporation was p,p'-biphenol. Pyromellitic dianhydride (PMDA) was obtained from Aldrich Chemical Company and was purified by suspending in acetic anhydride, stirring under reflux for 3 hours, filtering and washing with methylene chloride and diethyl ether, and drying in vacuo at 1 mm Hg or less at ca. 100° C. for several hours. Dimethylacetamide (DMAc) was distilled from barium oxide prior to use.

Unless otherwise noted, melting points were taken by differential scanning calorimetry on a Du Pont 990 thermal analyzer. All thermal-gravimetric analyses (TGAs) and thermal mechanical analyses (TMAs) were taken on a Du Pont 990 thermal analyzer. Gel permeation chromatography was done on a Waters 150-C gel permeation chromatograph equipped with $10^3$, $10^4$, and $10^5$-styragel columns connected in series, with column injector compartment, and pump temperatures at 35° C., 35° C., and 27° C., respectively, on 100-L samples at concentrations of 2% by weight, with dimethylformamide (DMF) eluent. Inherent viscosities were measured at 30° C. at concentrations of 0.5% by weight in DMAc.

EXAMPLE 1

Preparation of 2,2-bis[(2-chloro-4-aminophenoxy)pheynyl]hexafluoropropane (2-Cl-4-BDAF)

To a 1000 ml 3-necked round-bottom flask equipped with a magnetic stirring bar, Dean-Stark trap, condensor, heating mantle, and gas inlet adapter, there was placed bis-phenol AF (112 g, 333 mmol) and sodium hydroxide (26.8 g, 670 mg-at) in dry N,N-dimethylacetamide (DMAc, distilled from calcium hydride, 500 mL) under argon atmosphere. The mixture was stirred and brought to reflux with azeotropic removal of water. After about 20 hours, the water and toluene were removed by distillation, and the temperature of the resulting dark burgundy-colored reaction mixture was lowered to 110° C. The solution of bis-phenol AF dianion was added hot (ca. 135°–140° C.) over a period of 20–25 minutes to a stirred solution of 3,4-dichloronitrobenzene present in an amount of 128.6 g (670 mmol) in dry DMAc (ca. 400 mL) under argon atmosphere. Temperature of reaction under these conditions rose to about 105°–110° C. After addition was complete, the stirred mixture was heated at from about 105°–120° C. for about 2 hours, then cooled to ambient temperature and poured onto 2000 mL of water. A yellowish-brown solid precipitated out and was filtered, washed with ethanol, dissolved in 700 mL of ethyl acetate, then treated with 200 mL of ethanol and left to recrystallize. The precipitate was filtered, washed once with ice-cold ethanol, pulverized and air-dried to yield glistening beige crystals (148 g, 229 mmol, 69% yield). Melting point was 160° C. (DSC melting point, single peak). Infrared was 1345 cm$^{-1}$ (—NO$_2$). Elemental analysis with % actual, theoretical in parentheses, was: C, 50.8

(50.1); H, 2.4 (2.2); N, 5.4 (4.3); O, 14.8 (14.8); Cl, 0.5 (11.0); and F, 17.7 (17.6). The 2-Cl-4-BDNF (23.48 g, 374 mmol) was dissolved in ethyl acetate (350 mL). Five percent palladium on carbon (Alfa, 1.45 g, equivalent of 0.7 mmol Pd,m 1.9 mol %) was added, and the mixture treated with hydrogen in a Parr reactor. Theoretical uptake of hydrogen was observed within 4-8 hours. The mixture was filtered, and the supernatant concentrated to yield a beige-colored solid (21.4 g, 100% crude yield), homogeneous by tlc, m.p. 201° C. (Fisher-Johns, uncorrected), 200° C. (endotherm in differential scanning calorimetry). Determined IR was 3640 cm$^{-1}$ (N—H), with no trace of —NO$_2$ absorption. Elemental analysis (% actual, theoretical in parentheses) was: C, 56.1 (55.2); H, 3.3 (3.1); N, 5.9 (4.8); O, 7.8 (5.4); Cl, 11.5 (12.1); F, 18.3 (19.4). Amine number (meq/g; theoretical in parentheses) was 5.12 (5.43).

EXAMPLE 2

Preparation of 4,4'-(4-aminophenoxy)biphenyl (4-BPDA)

To a 1000-ml 3-necked round-bottom flask equipped with magnetic stirring bar, condensor, Dean-Stark trap, thermometer, and gas inlet adapter, there was placed p,p'-biphenol (Buffalo Color Corporation, 37.2 g, 200 mmol) in dry N,N-dimethylacetamide (DMAc, distilled from barium oxide, 250 mL) under argon atmosphere. The stirred mixture was brought to reflux with azeotropic removal of water. After 21 hours, the water and solvent were removed by distillation, and the white suspension of the salt was kept at from 135°-140° C. Then, under vigorous stir, 4-chloronitrobenzene (63.4 g, 440 mmol) was added portionwise over a 5- to 7-minute period. The mixture became reddish, foamy, and exothermic during addition. Temperature was maintained at about 155° C. by rate of addition. After the addition was complete and the exotherm had subsided, the stirred mixture was maintained at 150° C. for 3 days, the cooled to room temperature and poured onto 1200 mL of water. A yellow solid was precipitated and filtered off, washed well with ice-cold ethanol, and air-dried to yield 80.8 g, or 94.4% crude. The product 4,4'-(nitrophenoxy)biphenyl (4-BPDN) was homogeneous by analytical thin-layer chromatography (silica gel, 60:40 hexanes:benzene, R$_f$=0.092). M.p. 193°-195° C. (Fisher-Johns, uncorrected); 195° C. (somewhat broad endotherm, differential scanning calorimetry). IR: 1330, 1340 cm$^{-1}$ (—NO$_2$). Elemental analysis (% actual, theoretical in parentheses) was: C, 68.8 (67.3); H, 4.2 (3.7); N, 6.4 (6.6); O, 22.2 (22.4). The crude 4-BPDN (21.5 g, 50 mmol) was suspended in 200 mL dimethyl formamide along with 5% palladium on carbon (Alfa, 1.0 g, 1 mol % Pd). The suspension was treated with hydrogen in the Parr reactor. Theoretical uptake of hydrogen was observed in 3 hours. The mixture was filtered, and the supernatant was concentrated in vacuo at elevated temperature to yield a gray solid. The solid was pulverized, washed well with ice-cold ethanol, and air-dried to yield 17.4 g of material (47.3 mmol, 94.2% yield). M.p. 200°-201° C. (Fisher-Johns, uncorrected), IR: 3380 cm$^{-1}$ (>N—H; no —NO$_2$ band present). Elemental analysis (% actual, theoretical in parentheses) was: C, 78.1 (78.3); H, 5.7 (5.4); N, 7.5 (7.6); O, 9.8 (8.7). Amine number (meq/g, theoretical in parentheses) was 3.32 (3.41).

EXAMPLE 3

Preparation of Polymers

The following procedure is typical preparation for a 2-Cl-4-BDAF/PMDA polymer.

In a flame-dried 100 mL 4-necked resin kettle equipped with overhead stirrer and gas inlet adapter was dissolved 2-Cl-4-BDAF (10.0 g, 17 mmol) in DMAc (41 g) under argon atmosphere. Then PMDA (3071 g, 17 mmol) was added portionwise over 7 minutes. The viscous amber-colored solution was then stirred for 2½ hours. This corresponds to a 25% by weight solids content of the resin varnish. The resin varnish was concentrated in vacuo (<1 mm Hg) at elevated temperatures (~100° C.) to a dry mass, which was pulverized to a powder and imidized by heating in vacuo (<1 mm Hg) at from 200°-240° C. for from 3-22 hours.

Using the same procedure, equimolar quantities of 2,2-bis[(2-chloro-4-aminophenoxy)phenyl]hexafluoropropane and 2,2-bis(3,4-dicarboxyphenyl)hexafluoropropane dianhydride were reacted and imidized to form a 2-Cl-4-BDAF/6-FDA polymer.

There were also formed by the procedure, 4-BPDA/6-FDA and 4-BDAF/PMDA polymers.

Isothermal Thermo-Oxidative Stability Assessment

The polymers, 2-Cl-4-BDAF/PMDA, 2-Cl-4-BDAF/6-FDA, 4-BDAF$^{(a)}$/6-FDA, 4-BPDA/PMDA, 4-BPDA/6-FDA, and 4-BDAF/PMDA, were assessed for thermo-oxidative stability by isothermal aging in air at 644° K. (700° F.) for two hundred forty hours. The polyimides were tested as powders to assure large surface areas for exposure and acceleration of air oxidation to rapidly discern the relative thermo-oxidative stability of the candidates. A molded specimen of the 4-BDAF/PMDA was included in the test for comparison with the same material in powder form. Experience has shown that molded specimens will demonstrate decidedly lower weight loss than the corresponding high surface area powder. The molded control specimen was one-half of a 2.54-cm disc which was 0.63 cm thick (i.e., one-half of a 1-inch-diameter×¼-inch-thick disc).

The samples were prepared for the study by solvent drying and imidization for from 20-24 hours at 493° K. (436° F.). The polyimide candidates were powdered in a blender, then screened to particles averaging 25-mesh-size. The powders were then post-cured in a Blue M CFD-10F-4 oven at 672° K. (750° F.) for 4 hours, employing an air flow of 11.8 cc/second. Bottled air was employed as the oxidizing atmosphere.

(a) 2,2-bis[4-(4-aminophenoxy)phenyl]hexafluoropropane

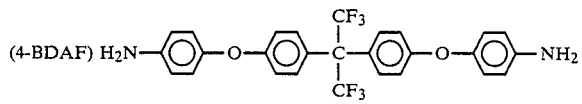

The themo-oxidative assessment studies are reported in Table I. In general, it can be said that matrix resins which can demonstrate a weight loss of 15% or less as a powder would be expected to be outstanding candidates for actual use in advanced aircraft engines. Conversely, those matrix resins which demonstrate a weight loss of 20% or greater would be suspect in that they would be expected to show a tendency to form microcracks in the molded resin causing a loss in structural integrity. Data for weight loss at 166 hours and 240 hours in included solely for purposes of completion as it can be seen from the Table that at these extreme oxidative environmental conditions the performance of all of the tested candidates has deteriorated to where the desired performance cannot be achieved.

As shown in Table I, our novel 2-Cl-4-BDAF/6-FDA polyimide surprisingly had a weight loss of only 13.0% after 109 hours in air at 700° F. This is particularly unexpected in view of the 24.4% weight loss of the 4-BDAF/6-FDA control. Thus, the weight-loss data given in Table I establish 2-Cl-4-BDAF/6-FDA to be a thermally superior polyimide. The 2-Cl-4-BDAF/PMDA polyimide displayed good thermal stability.

Conversely, the two resins prepared from the 4-BPDA diamine, namely, 4-BPDA/PMDA and 4-BPDA/6-FDA, clearly were not suitable for consideration for service at 644° K. (700° F.).

TABLE I

SUMMARY OF ISOTHERMAL AGING AT 644° K. (700° F.) IN AIR

| Polyimide Candidate | Weight Loss as a Function of Isothermal Aging in Air at 644° K. | | | |
|---|---|---|---|---|
| | 40 hours | 109 hours | 166 hours | 240 hours |
| 4-BDAF/PMDA Control (Neat Resin Disc) | 1.3 | 5.4 | 10.3 | 19.3 |
| 4-BDAF/PMDA Control (Powder) | 4.2 | 21.5 | 44.6 | 69.3 |
| 4-BDAF/6-FDA Control (Powder) | 6.5 | 24.4 | 43.1 | 65.3 |
| 2-Cl—4-BDAF/PMDA (Powder) | 4.6 | 28.7 | 62.3 | 89.7 |
| 2-Cl—4-BDAF/6-FDA (Powder) | 4.4 | 13.0 | 39.9 | 58.2 |
| 4-BPDA/PMDA (Powder) | 53.0 | 98.1 | 98.9 | 99.0 |
| 4-BPDA/6-FDA (Powder) | 60.0 | 92.5 | 99.5 | 99.6 |

What is claimed is:
1. 2,2-bis[(2-halo-4-aminophenoxy)phenyl]hexafluoropropane.
2. 2,2-bis[(2-chloro-4-aminophenoxy)phenyl]hexafluoropropane.

* * * * *